H. R. VAN DEVENTER.
COMBINED GENERATOR, LAMP, HORN, AND SPEEDOMETER.
APPLICATION FILED MAY 26, 1916.

1,265,282.

Patented May 7, 1918.

INVENTOR
H. R. Van Deventer

UNITED STATES PATENT OFFICE.

HARRY RANDOLPH VAN DEVENTER, OF SUMTER, SOUTH CAROLINA, ASSIGNOR TO SPLITDORF ELECTRICAL COMPANY, OF NEWARK, NEW JERSEY, A CORPORATION OF NEW JERSEY.

COMBINED GENERATOR, LAMP, HORN, AND SPEEDOMETER.

1,265,282.   Specification of Letters Patent.   Patented May 7, 1918.

Application filed May 26, 1916. Serial No. 100,032.

*To all whom it may concern:*

Be it known that I, HARRY RANDOLPH VAN DEVENTER, a citizen of the United States, residing at Sumter, in the county of Sumter and State of South Carolina, have invented certain new and useful Improvements in Combined Generators, Lamps, Horns, and Speedometers, of which the following is a specification, reference being had to the accompanying drawing.

My invention relates to a combination generator, electric lamp, signaling device, and speedometer.

In my application for patent Serial No. 99,856 filed May 25, 1916, I show, describe and claim a device comprising an electric generator, a lamp, and a signaling device arranged in a single compact structure and adapted to be secured to a vehicle such as a motorcycle or bicycle. The object of the present invention is to provide in addition to the aforesaid combination, a speedometer such as commonly used on vehicles, and to arrange the speedometer within and upon the generator casing and to provide a suitable means for driving the speedometer from the same driving means employed for operating the generator.

While the accompanying drawings show the complete combination, it will be obvious that the parts constituting the sound-producing device hereinafter referred to as "horn" may be dispensed with without however departing from the invention as hereinafter claimed.

Figures 1, 2:
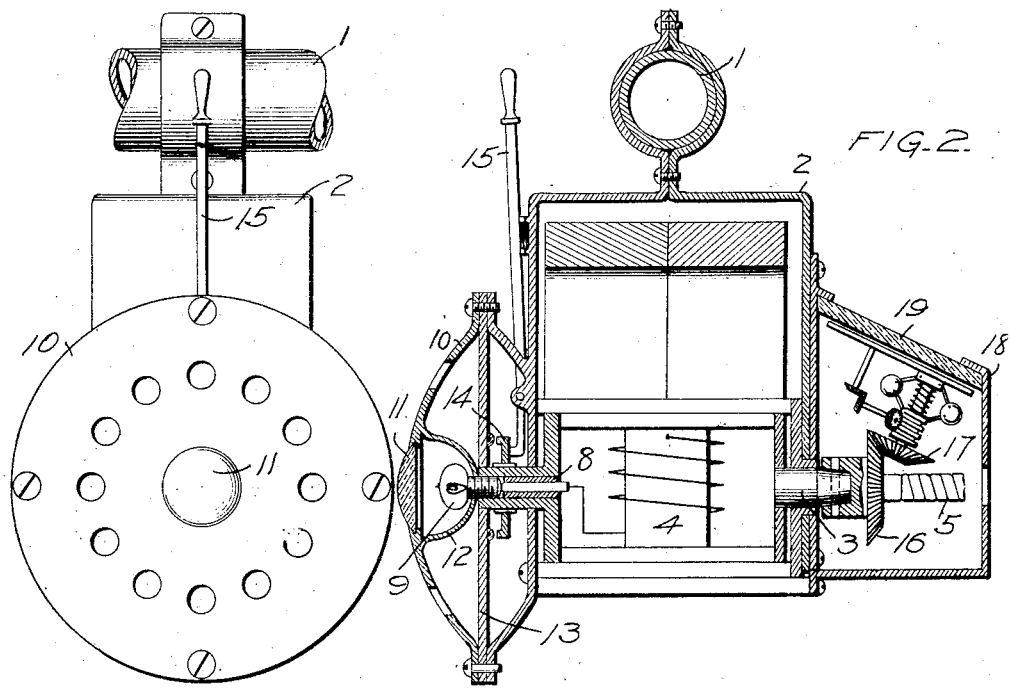
Figure 3:
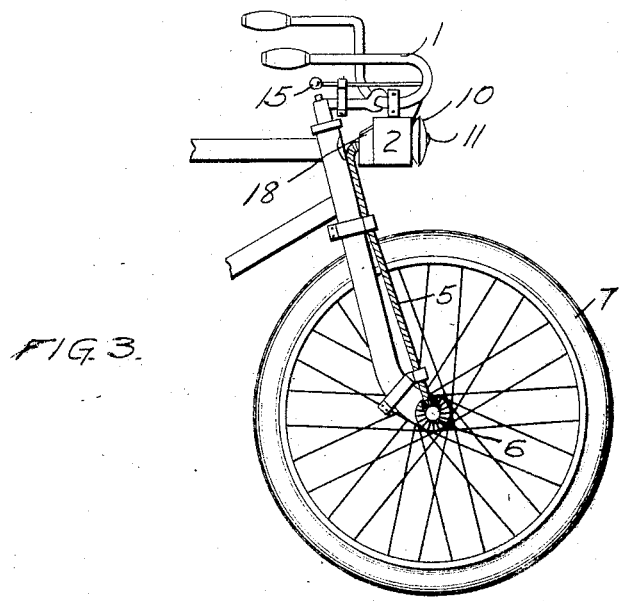

In the accompanying drawing, in which like figures of reference denote the same parts wherever they are shown, Figure 1 is a front view of the device embodying my invention, Fig. 2 a view partly in section of the same, and Fig. 3 a view illustrating the application of the device to an ordinary bicycle.

The numeral 1 denotes the frame work or handle bars of the vehicle to which the device is attached, but it may be attached to any other part, and 2 denotes the casing of the generator adapted to inclose and protect it together with the horn and speedometer mechanism.

The generator may be of any suitable form and has a driving shaft 3 for the armature or other rotating part 4. This is driven in any suitable manner as by the well-known flexible shaft 5 and gear 6, the latter connected to some moving part of the vehicle such as the wheel 7 of the bicycle shown in Fig. 3.

Mounted in the stub shaft 8 is the lamp 9; and the arrangement whereby this lamp is connected directly to the armature winding and is movable with the rotating part of the generator is already known, so I do not describe the same here.

In front of the lamp 9 part of the casing is formed as shown to make a support for the front plate 10 in which is placed a suitable lens 11 for the lamp, which may be surrounded by a reflector 12.

Mounted upon the generator casing in the manner clearly shown in Fig. 2 is the diaphragm 13 of the horn having a central aperture large enough to clear the projecting shaft 8 and lamp 9.

Suitable actuating mechanism indicated by the toothed wheel 14 and the lever 15 is provided for actuating the diaphragm at will, all as described in my hereinbefore mentioned application executed May 17th, 1916.

The particular feature I desire to disclose and claim in this application is the addition to the foregoing elements of the speedometer; and to this end I arrange a suitable gear 16 upon the shaft of the magneto or the driving shaft 5. Meshed with this is the gear 17 of any suitable form of speedometer mechanism which is surrounded by the casing 18 having the glass top 19 whereby the dial of the said speedometer may be observed. The casing 18 may be integral with the casing surrounding the generator, or may be a separate piece or pieces attached to the main casing.

It will be obvious from a study of the figures that the result of the above combination of devices, all of which are commonly used on motorcycles and bicycles, is the production of a compact unit having a common driving shaft 4 and providing light, signals, and a speed-indicating device arranged in compact form, and having a minimum of parts and these of comparatively rugged construction.

And while I here disclose a practical embodiment of the combination of parts constituting my invention, it will be understood that I do not limit myself to the precise structure herein disclosed, as it is obvious to those skilled in the art that many modifications may be made in the arrangement of the various parts and their relation to each other without, however, departing from the spirit of the invention as herein claimed by me.

Having thus disclosed my invention, I claim:

1. A device adapted to be secured to a vehicle and comprising in combination an electric generator, a lamp connected therewith, a speedometer, common actuating means for said generator and speedometer, and a common casing in and upon which all of the aforesaid devices are mounted to form a unitary structure, substantially as described.

2. A device adapted to be secured to a vehicle and comprising in combination an electric generator, a lamp connected therewith, a sound-producing device, a speedometer, common actuating means for said generator, sound-producing device, and speedometer, and a common casing in and upon which all of the aforesaid devices are mounted to form a unitary structure, substantially as described.

3. A device adapted to be secured to a vehicle and comprising in combination an electric generator, a lamp connected with the movable part of said generator, a speedometer, common actuating means for said generator and speedometer, and a casing in and upon which all of the aforesaid devices are mounted to form a unitary structure.

4. A device adapted to be secured to a vehicle and comprising in combination in a common casing an electric generator, a lamp, connected to said generator, a speedometer, and common actuating means for said generator and speedometer.

5. A device adapted to be secured to a vehicle and comprising in combination in a common casing and forming a unit structure an electric generator having an armature, a lamp connected to said armature and revoluble therewith, a sound-producing device including a diaphragm having a central aperture, a speedometer, means on said armature shaft for driving said speedometer, means connected to said armature shaft for operating the same, together with said speedometer and sound-producing device, substantially as described.

6. A device adapted to be secured to a vehicle and comprising in combination in a casing forming a unitary structure an electric generator, a lamp connected to said generator, a sound-producing device having a diaphragm mounted on said casing, means for connecting the moving part of said generator to said diaphragm at will, a speedometer, and common actuating means for said generator, sound-producing device, and speedometer, substantially as described.

In testimony whereof I hereunto affix my signature.

HARRY RANDOLPH VAN DEVENTER.